(12) United States Patent
Madsen et al.

(10) Patent No.: US 12,473,638 B2
(45) Date of Patent: Nov. 18, 2025

(54) LIQUID PRECURSOR VAPORIZER

(71) Applicant: Lam Research Corporation, Fremont, CA (US)

(72) Inventors: Eric Russell Madsen, Sherwood, OR (US); Seyedalireza Torbatisarraf, San Jose, CA (US); Yu Jiang, San Jose, CA (US); Narudha Tai Benyuhmin, Santa Clara, CA (US)

(73) Assignee: Lam Research Corporation, Fremont, CA (US)

( * ) Notice: Subject to any disclaimer, the term of this patent is extended or adjusted under 35 U.S.C. 154(b) by 301 days.

(21) Appl. No.: 17/783,264

(22) PCT Filed: Dec. 7, 2020

(86) PCT No.: PCT/US2020/063637
§ 371 (c)(1),
(2) Date: Jun. 7, 2022

(87) PCT Pub. No.: WO2021/118935
PCT Pub. Date: Jun. 17, 2021

(65) Prior Publication Data
US 2023/0037208 A1 Feb. 2, 2023

Related U.S. Application Data

(60) Provisional application No. 62/946,864, filed on Dec. 11, 2019.

(51) Int. Cl.
*C23C 16/44* (2006.01)
*B22F 10/28* (2021.01)
(Continued)

(52) U.S. Cl.
CPC ............ *C23C 16/448* (2013.01); *B22F 10/28* (2021.01); *B22F 10/64* (2021.01); *B33Y 10/00* (2014.12);
(Continued)

(58) Field of Classification Search
CPC .................................................. C23C 16/448
See application file for complete search history.

(56) References Cited

U.S. PATENT DOCUMENTS 6,056,823 A * 5/2000 Sajoto ................. C23C 16/4401
118/715
6,248,399 B1 * 6/2001 Hehmann ............... C23C 14/22
137/561 A (Continued)

FOREIGN PATENT DOCUMENTS

CN 103031542 A 4/2013
CN 104878349 A 9/2015
(Continued)

OTHER PUBLICATIONS

English translation JP H05106047, Apr. 27, 1993, Tsutahara (Year: 1993).*
(Continued)

*Primary Examiner* — Keath T Chen
(74) *Attorney, Agent, or Firm* — Schwegman Lundberg & Woessner, P.A.

(57) ABSTRACT

In some examples, a liquid precursor vaporizer comprises an inlet, an outlet, and a first vaporizer core, the first vaporizer core including a plurality of nested cells defining a plurality of tortuous paths through which a liquid precursor can pass in a path between the inlet and the outlet of the liquid precursor vaporizer.

15 Claims, 9 Drawing Sheets

(51) Int. Cl.
  *B22F 10/64* (2021.01)
  *B33Y 10/00* (2015.01)
  *B33Y 40/20* (2020.01)
  *B33Y 80/00* (2015.01)
  *C23C 16/448* (2006.01)

(52) U.S. Cl.
  CPC ............... *B33Y 40/20* (2020.01); *B33Y 80/00* (2014.12); *B22F 2301/15* (2013.01)

(56) References Cited

U.S. PATENT DOCUMENTS

| | | | |
|---|---|---|---|
| 2004/0182855 A1 | 9/2004 | Centanni | |
| 2006/0185597 A1* | 8/2006 | Suzuki | C23C 16/4481 118/726 |
| 2017/0029946 A1 | 2/2017 | Gregg et al. | |
| 2017/0114445 A1 | 4/2017 | Long | |
| 2017/0252787 A1* | 9/2017 | Stawovy | B32B 15/01 |
| 2017/0292183 A1* | 10/2017 | Roberge | C23C 4/134 |
| 2017/0342557 A1* | 11/2017 | Baum | C23C 16/4483 |
| 2018/0093418 A1 | 4/2018 | Lappas et al. | |
| 2018/0094351 A1 | 4/2018 | Verghese et al. | |
| 2019/0271080 A1* | 9/2019 | Higashi | C23C 16/455 |
| 2021/0148564 A1* | 5/2021 | Nasman | F22B 1/18 |
| 2022/0213599 A1* | 7/2022 | Lind | C23C 16/45561 |
| 2023/0271248 A1* | 8/2023 | Myrick | B29C 64/165 |

FOREIGN PATENT DOCUMENTS

| | | |
|---|---|---|
| CN | 107881483 A | 4/2018 |
| CN | 114787414 | 7/2022 |
| JP | H0516047 A | 1/1993 |
| JP | 2007518267 A | 7/2007 |
| JP | 2007534132 A | 11/2007 |
| JP | 2013118402 | 6/2013 |
| JP | 2018535121 A | 11/2018 |
| JP | 2023505780 | 2/2023 |
| KR | 20170026531 A | 3/2017 |
| KR | 20180036525 | 4/2018 |
| KR | 20190128265 | 11/2019 |
| TW | I895308 | 9/2025 |
| WO | WO-2018191125 A1 | 10/2018 |

OTHER PUBLICATIONS

International Application Serial No. PCT/US2020/063637, International Search Report mailed Mar. 29, 2021, 5 pgs.

International Application Serial No. PCT/US2020/063637, Written Opinion mailed Mar. 29, 2021, 5 pgs.

"International Application Serial No. PCT US2020 063637, International Preliminary Report on Patentability mailed Jun. 23, 2022", 7 pgs.

"Japanese Application Serial No. 2022-534152, Voluntary Amendment Filed Dec. 6, 2023", w English Claims, 12 pgs.

Taiwanese Application Serial No. 109143607, Office Action mailed Oct. 7, 2024, w/English Translation, 17 pgs.

Japanese Application Serial No. 2022-534152, Notification of Reasons for Rejection mailed Jan. 7, 2025, W/English Translation, 6 pgs.

"Taiwanese Application Serial No. 109143607, Response filed Jan. 7, 2025 to Office Action mailed Oct. 7, 2024", w English claims, 20 pgs.

"Japanese Application Serial No. 2022-534152, Response filed Apr. 3, 2025 to Notification of Reasons for Rejection mailed Jan. 7, 2025", w current English claims, 21 pgs.

"Singapore Application Serial No. 112022502390, Written Opinion mailed May 19, 2025", 8 pgs.

"Japanese Application Serial No. 2022-534152, Notification of Reasons for Rejection mailed Jul. 1, 2025", w English Translation, 6 pgs.

"Korean Application Serial No. 10-2022-7023197, Notice of Preliminary Rejection mailed Sep. 16, 2025", W English Translation, 13 pgs.

* cited by examiner

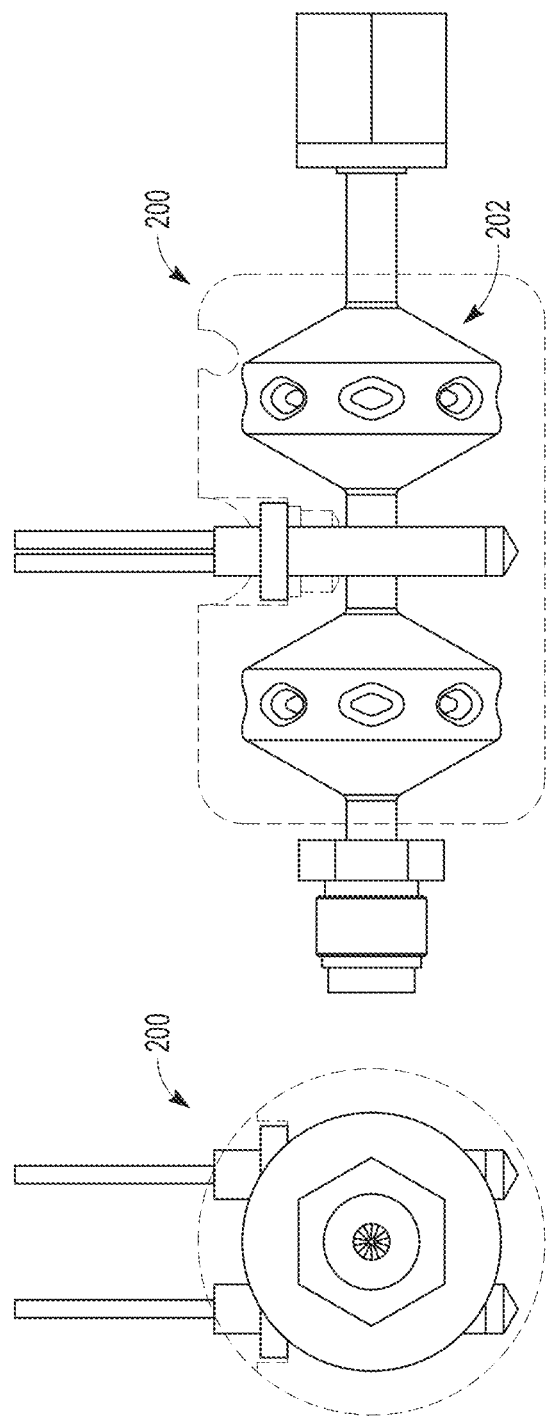

LIQUID PRECURSOR VAPORIZER

CLAIM OF PRIORITY

This application is a U.S. National Stage Filing under 35 U.S.C. 371 from International Application No. PCT/US2020/063637, filed on Dec. 7, 2020, and published as WO 2021/118935 A1 on Jun. 17, 2021, which claims the benefit of priority to U.S. Provisional Patent Application No. 62/946,864, filed on Dec. 11, 2019, entitled Liquid Precursor Vaporizer, each of which is incorporated by reference herein in its entirety.

FIELD

The present disclosure relates to substrate processing systems and more particularly to systems and methods for vaporizing a liquid precursor. Some examples relate to a high-flow thermal-kinetic vaporizer, in particular, for vaporizing a liquid tetraethyl orthosilicate (TEOS) precursor.

BACKGROUND

Substrate processing systems may be used to deposit film on substrates such as semiconductor wafers. Example processes that may be performed on a substrate include, but are not limited to, chemical vapor deposition (CVD), atomic layer deposition (ALD), plasma-enhanced CVD (PECVD), and plasma-enhanced ALD (PEALD). A substrate may be arranged on a substrate support, such as a pedestal, an electrostatic chuck (ESC), and so forth, in a processing chamber of the substrate processing system. During processing, a gas mixture is introduced into the processing chamber and plasma may be used to enhance chemical reactions within the processing chamber.

Tetraethyl orthosilicate (TEOS) precursor gas may be used when depositing silicon dioxide ($SiO_2$) film to create a highly conformal $SiO_2$ film on a substrate. The precursor gas may be injected as a liquid into the substrate processing system and requires vaporization before being admitted to the processing chamber. Many of the existing TEOS precursor delivery systems require expensive and risky methods to achieve complete atomization and vaporization. The present disclosure seeks to address at least these drawbacks.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In some examples, a liquid precursor vaporizer comprises an inlet; an outlet; and a first vaporizer core, the first vaporizer core including a plurality of nested cells defining a plurality of tortuous paths through which a liquid precursor can pass in a path between the inlet and the outlet of the liquid precursor vaporizer.

In some examples, at least one of the plurality of tortuous paths includes a series of alternating pinch and expanding regions.

Some examples further comprise a second vaporizer core in communication with the first vaporizer core, the first and second vaporizer cores defining the path for the liquid precursor between the inlet and the outlet of the liquid precursor vaporizer.

Some examples further comprise a sheath enclosing the first and second vaporizer cores. In some examples, the sheath enclosing the first and second vaporizer cores includes an aluminum material. In some examples, the aluminum material extends into a central volume of each of the first and second vaporizer cores.

In some examples, the first vaporizer core is manufactured by an additive manufacturing (AM) process. In some examples, the AM process includes the use of laser fused Inconel 718 as an AM material. In some examples, the AM process includes a post-annealing operation to remove porosity.

Some examples further comprise a heater.

Some examples further comprise at least one heater disposed between the first and second vaporizer cores.

Further areas of applicability of the present disclosure will become apparent from the detailed description, the claims, and the drawings. The detailed description and specific examples are intended for purposes of illustration only and are not intended to limit the scope of the disclosure.

DESCRIPTION OF THE DRAWINGS

Some embodiments are illustrated by way of example and not limitation in the views of the accompanying drawings:

FIGS. 6A-6D depict further various views of an example liquid precursor vaporizer.

DESCRIPTION

Figure 1:
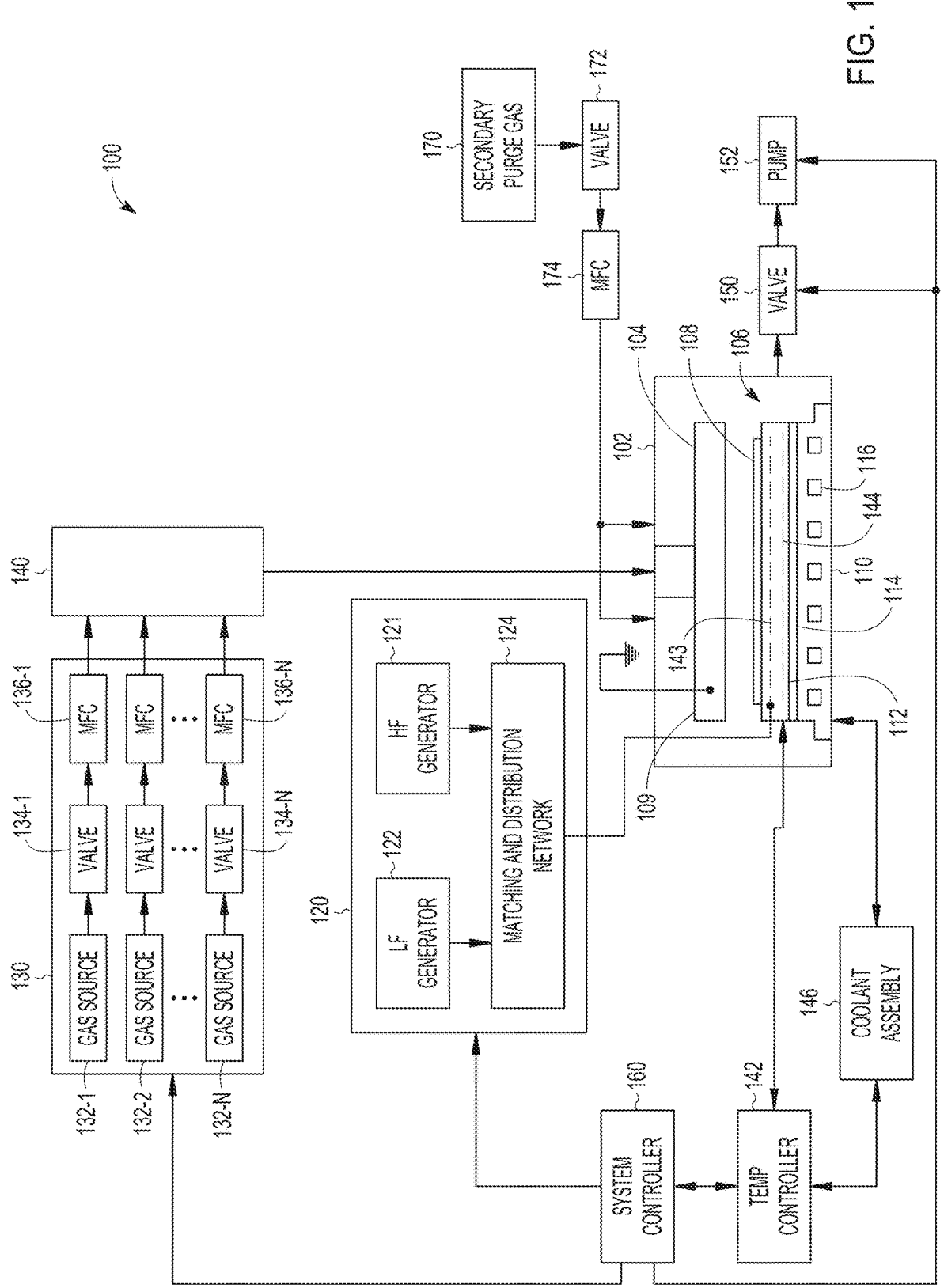
FIG. 1 is a functional block diagram of an example of a substrate processing system for depositing tetraethyl orthosilicate (TEOS) film in which examples of the present disclosure may be used.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art, that the present embodiments may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to any data as described below and in the drawings that form a part of this document: Copyright Lam Research Corporation, 2019-2020. All Rights Reserved.

Referring now to FIG. 1, an example substrate processing system 100 for performing deposition is shown. While a PECVD substrate processing system is shown, a PEALD substrate processing system or other substrate processing system may be used. The substrate processing system 100 includes a processing chamber 102 that encloses other components of the substrate processing chamber 102 and contains plasma. The substrate processing chamber 102 includes a gas distribution device 104 and a substrate support 106, such as an ESC. During operation, a substrate 108 is arranged on the substrate support 106.

In some examples, the gas distribution device 104 may include a powered showerhead 109 that distributes process gases over the substrate 108 and induces ion bombardment. The showerhead 109 may include a stem portion including one end connected to a top surface of the processing chamber 102. A base portion is generally cylindrical and extends radially outwardly from an opposite end of the stem portion at a location that is spaced from the top surface of the processing chamber 102. A substrate-facing surface or faceplate of the base portion of the showerhead 109 includes a plurality of distributed holes through which process gas flows. The gas distribution device 104 may be made of a metallic material and may act as an upper electrode. Alternately, the gas distribution device 104 may be made of a non-metallic material and may include an embedded electrode. In other examples, the upper electrode may include a conducting plate and the process gases may be introduced in another manner. The substrate support 106 includes a conductive baseplate 110 that acts as a lower electrode. The baseplate 110 supports a beating plate 112, which may correspond to a ceramic multi-zone heating plate. A thermal resistance layer 114 may be arranged between the heating plate 112 and the baseplate 110. The baseplate 110 may include one or mom coolant channels 116 for flowing coolant through the baseplate 110.

A Radio Frequency (RF) generating system 120 generates and outputs an RF voltage to one of the upper electrodes (e.g., the gas distribution device 104) and the lower electrode (e.g., the baseplate 110 of the substrate support 106). The other one of the upper electrode and the lower electrode may be DC grounded at 143, AC grounded, or floating. In some examples, the RF generating system 120 may supply dual-frequency power including a high frequency (HF) generator 121 and a low frequency (LF) generator 122 that generate the HF and LF power (at predetermined frequencies and power levels, respectively) that is fed by a matching and distribution network 124 to the upper electrode or the lower electrode (or the showerhead).

A gas delivery system 130 includes one or more gas sources 132-1, 132-2, . . . , and 132-N (collectively, gas sources 132), where N is an integer greater than zero. The gas sources 132 supply one or more process gas mixtures, dopants, carrier gas, liquid precursors, and/or purge gas. In some examples, the gas delivery system 130 delivers a precursor gas, such as a mixture of tetraethyl orthosilicate (TEOS) gas, a gas including an oxygen species and argon (Ar) gas during deposition, and dopants including triethylphosphate (TEPO) and/or triethylborate (TEB). In some examples, diffusion of the dopants occurs from the gas phase. For example, a carrier gas (e.g., nitrogen, argon, or other) is enriched with the desired dopant (also in gaseous form, e.g., triethylphosphate (TEPO) and/or triethylborate (TEB)) and supplied to the silicon wafer on which a concentration balance can take place. In subsequent processes, a wafer may be placed in a quartz tube that is heated to a certain temperature.

Returning to FIG. 1, the gas sources 132 are connected by valves 134-1, 134-2, . . . , and 134-N (collectively, valves 134) and mass flow controllers 136-1, 136-2, . . . , and 136-N (collectively, mass flow controllers 136) to a mixing manifold 140. The gases are supplied to the mixing manifold 140 and mixed therein. An output of the mixing manifold 140 is fed to the processing chamber 102. In some examples, the output of the mixing manifold 140 is fed to the showerhead 109. Secondary purge gas 170 may be supplied to the processing chamber 102, such as behind the showerhead 109, via a valve 172 and a mass flow controller (MFC) 174.

A temperature controller 142 may be connected to a plurality of thermal control elements (TCEs) 144 arranged in the heating plate 112. For example, the TCEs 144 may include, but are not limited to, respective macro TCEs corresponding to each zone in a multi-zone heating plate and/or an array of micro TCEs disposed across multiple zones of a multi-zone heating plate. The temperature controller 142 may be used to control the plurality of TCEs 144 to control a temperature of the substrate support 106 and the substrate 108. The temperature controller 142 may communicate with a coolant assembly 146 to control coolant flow through the channels 116. For example, the coolant assembly 146 may include a coolant pump and reservoir. The temperature controller 142 operates the coolant assembly 146 to selectively flow the coolant through the channels 116 to cool the substrate support 106. A valve 150 and pump 152 may be used to control pressure and to evacuate reactants from the processing chamber 102. A system controller 160 may be used to control components of the substrate processing system 100. Although shown as separate controllers, the temperature controller 142 may be implemented within the system controller 160.

Some examples of the present disclosure are directed to a vaporization device configured for use in liquid precursor delivery systems for either retrofit or build-forward. A precursor is generally a liquid first, before being vaporized as a gas. As mentioned above, conventional post-injection vaporization systems typically include an inline filter, which can be inefficient and difficult to purge in a process-enabling manner. Filter components are relatively large and bulky and may include inefficient and expensive heater jackets. The present disclosure socks to address at least these drawbacks.

Figure 2:
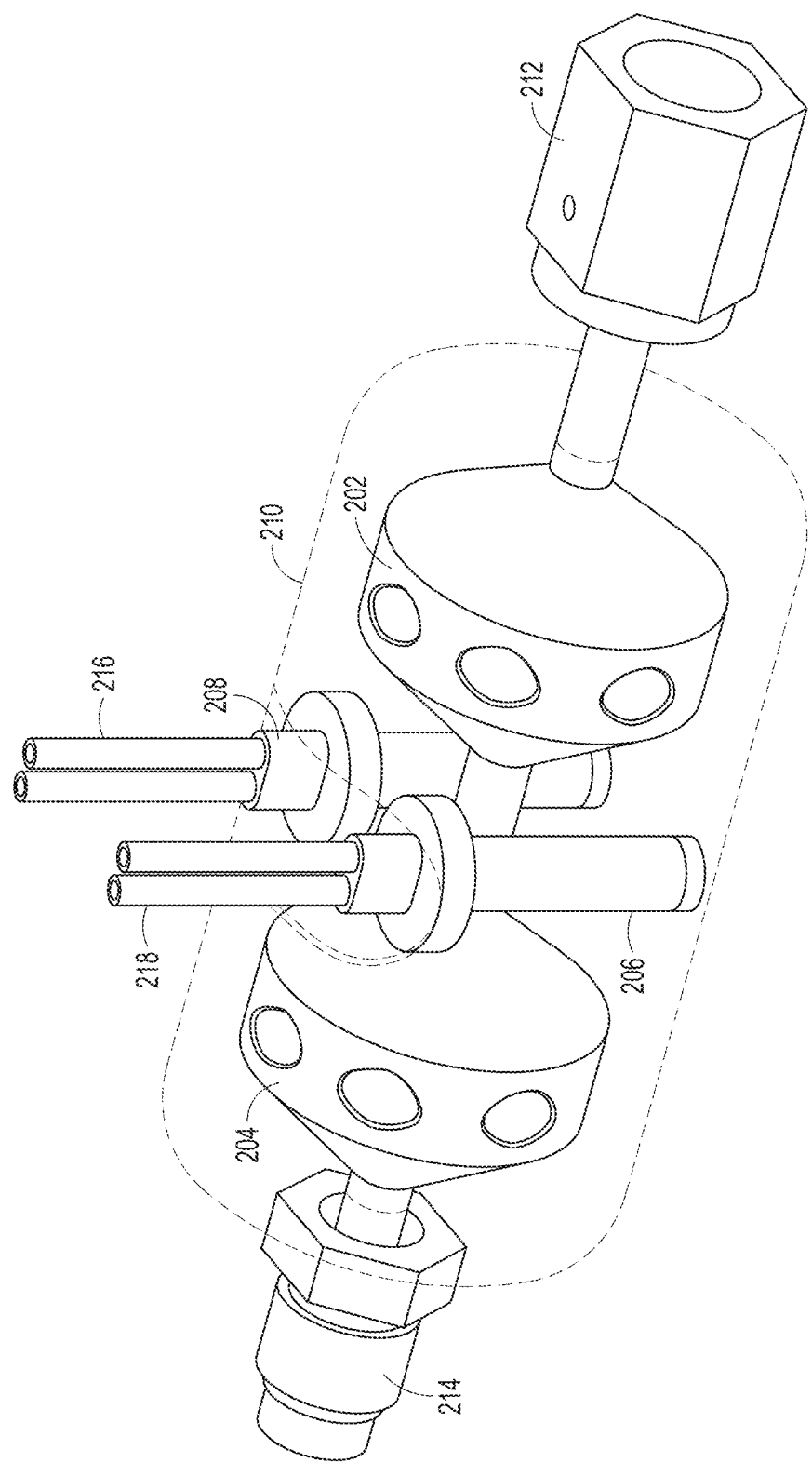
FIG. 2 depicts a liquid precursor vaporizer, according to an example embodiment.

With reference to FIG. 2, an example precursor vaporizer 200 (also termed a "vaporizer" herein) includes two vaporizer cores 202 and 204. A greater or lesser number, or other arrangement, of cores is possible. The illustrated arrangement of two vaporizer cores is believed to imbue the vaporizer with a degree of symmetry and facilitate an even distribution of heat provided to the cores from two heaters 206 and 208, as shown. The vaporizer cores 202 and 204, and the two heaters 206 and 208, are embedded in a weldment case or sheath 210. In some examples, the sheath 210 includes, or is provided in the form of, an aluminum casting.

In some examples, a vaporizer core 202 or 204 is manufactured by a three-dimensional (3D) printing process or an additive manufacturing (AM) process. The AM process may include the use of laser fused Inconel 718 as a printing material. Other high Ni alloys such as Inconel 625 and Alloy C22 with high corrosion resistance maybe uses as potential candidates. The AM process may include a post annealing process to remove porosity. A final surface finish in internal areas may be achieved via abrasive flow machining and chemical based processes. The AM process and materials may also be applied to manufacture of the vaporizer 200. In some examples, the vaporizer 200 includes an inlet 212 and an outlet 214. The inlet 212 and the outlet 214 are sized for standard quarter-inch gas line welding.

In some examples, the AM vaporizer cores 202 and 204 are machined and welded together post printing. After machining, the weldment is encased in aluminum (for example, by the sheath 210). The casted sheath 210 is machined or otherwise formed to define elongate temperatures for the two heaters 206 and 208, as shown. In some examples, the heaters 206 and 208 are provided in the form of inexpensive cartridge heaters supplied by respective power lines 216 and 218 from an external power source. A suitable cartridge heater may include a 100 to 150 Watt, 1-winch high-density cartridge.

In some examples, a central volume of the vaporizer 200 (for example, a central volume 502 in FIG. 5C discussed below) is filled with a thermal or heat-transmitting material, such as aluminum, to facilitate heat distribution across internal surfaces of the vaporizer 200 and the vaporizer cores 202 and 204. The two vaporizer cores 202 and 204, and the two heaters 206 and 208, may be substantially fully embedded in heat-transmitting material of the sheath 210, as shown. In some examples, outer surfaces of each vaporizer core 202 and 204 are left rough to assist in bonding of the sheath 210 material (for example, the aluminum) with the outer surfaces and to assist in surface conduction of heat across the outer surfaces.

Figure 3:
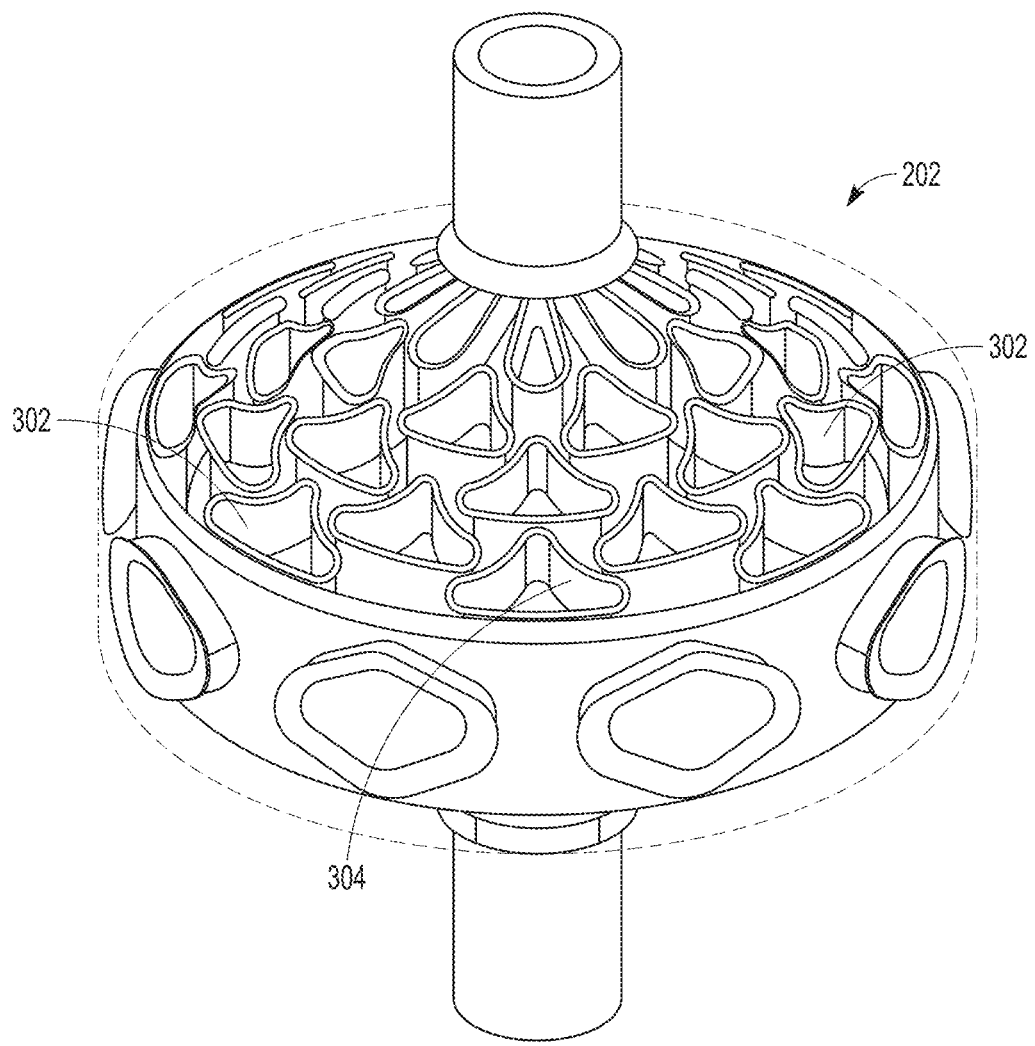
FIG. 3 depicts a pictorial, part sectional view of an example vaporizer core.
Figure 4:
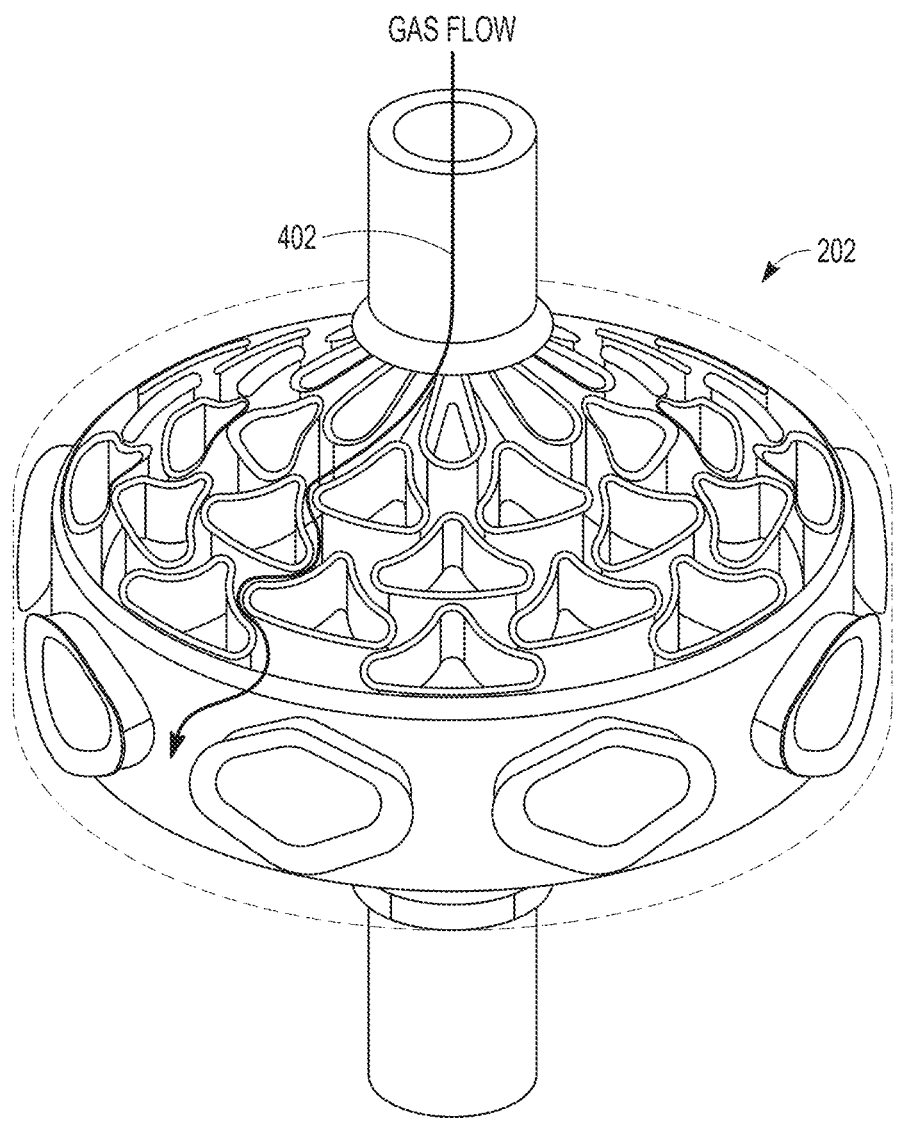
FIG. 4 depicts an example tortuous path defined by an example vaporizer core.

FIG. 3 depicts a pictorial, part sectional view of an example vaporizer core 202. The vaporizer core 202 includes a number of internal cells 302. One or more walls 304 of each cell 302 may include an arcuate or undulating profile, as shown. The nested arrangement of the cells 302, for example as shown, defines a multiplicity of tortuous paths for a liquid precursor to pass through as it travels through the vaporizer 200 from the inlet 212 to the outlet 214. As the liquid precursor passes through a tortuous path within the vaporizer core 202, the arcuate or undulating wall profiles of the cells 302 define an extensive set of surfaces from which the precursor may vaporize. An example tortuous path 402 between adjacent cells 302 is shown in FIG. 4. In some examples, the cells 302 are hollow, as shown. In other examples, the cells 302 may be partially or fully solid. It will be appreciated that other cell wall profiles, cell placement configurations, and tortuous paths are possible.

The inner geometry of a vaporizer core 202 can be changed to adjust for different types of precursor, thermal, and/or pressure process control parameters, or precursor flowrates. A material of the vaporizer core 202 may include stainless steel or other resistant metal for process compatibility. The size of a vaporizer core 202 can be adapted to suit half inch gas lines for higher flow applications.

Figure 5C:
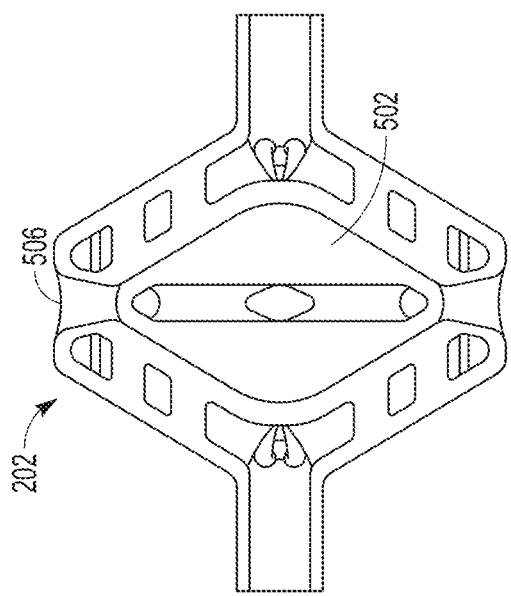
FIGS. 5A-SC depict various views of an example liquid precursor vaporizer.
Figure 5B:
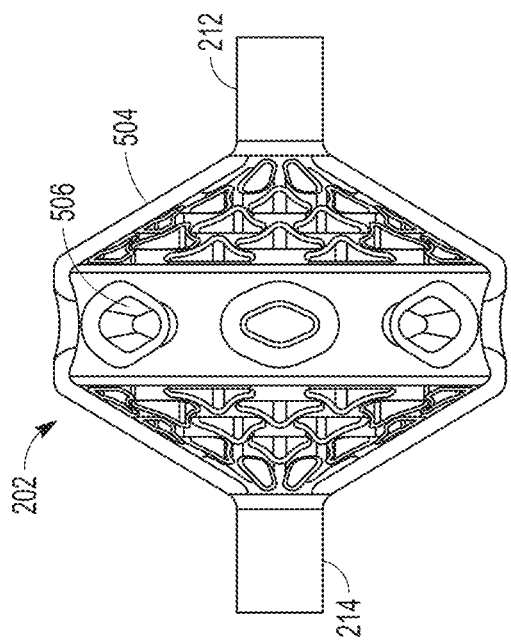
Figure 5A:
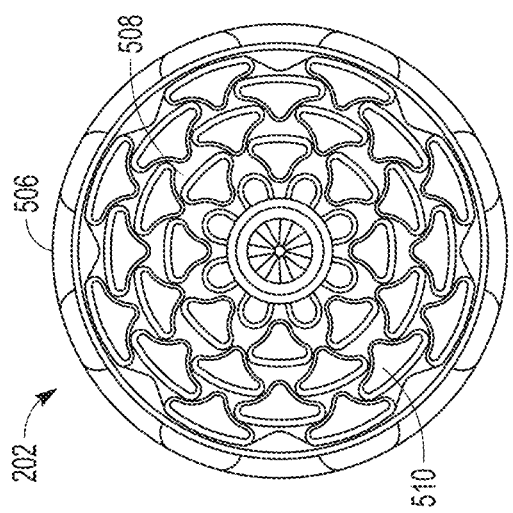
Figure 6A:
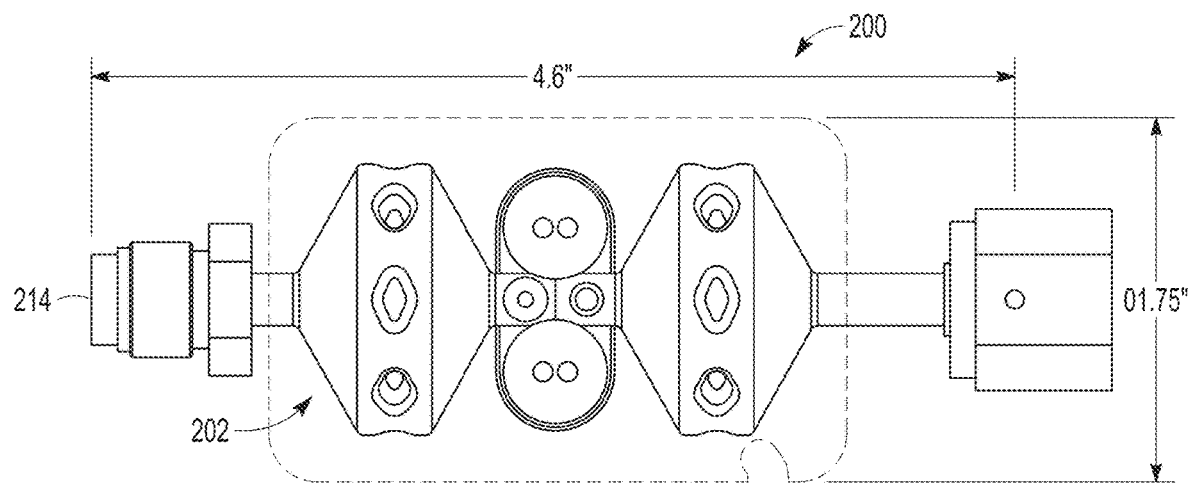
Figure 6B:
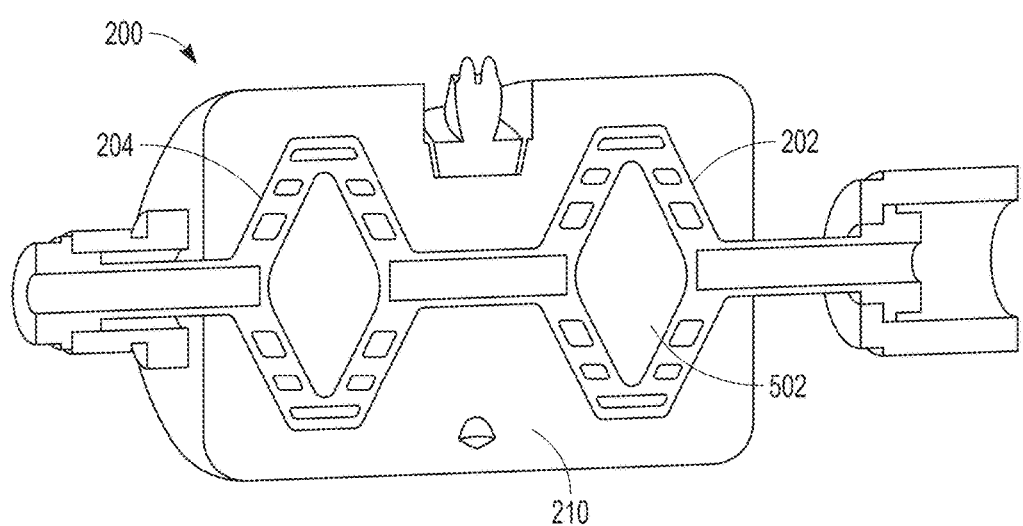

Reference is now made to FIGS. 5A-5C of the accompanying drawings. These views show, respectively, a pictorial part sectional top view of an example vaporizer core 202, a pictorial part sectional side view of an example vaporizer core 202, and a sectional side view of an example vaporizer core 202. In FIGS. 5A-5B, the cells 302 are shown visible (in the views) beneath an outer skin or wall 504 of the vaporizer core 202. Liquid precursor enters the vaporizer core 202 from an inlet 212 side and exits as a vaporized (or at least partially vaporized) precursor gas through an outlet 214 side. In the event the precursor gas is only partially vaporized by a single vaporizer core 202, a second in-line vaporizer core 204 may be provided, as discussed above.

A gently winding and unobstructed shape and configuration of the tortuous paths 402 defined by the cells 302 allow the vaporizer core 202 to purge liquid precursor quickly with minimal or no residual liquid precursor remaining in the vaporizer core 202 after closure of the inlet 212. Alternating pinching 510 and expanding 508 regions in a tortuous path 402 may be seen in FIG. 5A. The contracting and expanding volumes of a tortuous path 402 is believed to assist in vaporizing a liquid precursor off the cell walls. The nested configuration of the cells is believed to assist thermal conduction of heat in a heat transfer path from a heater 206 or 208 to the liquid precursor through the vaporizer core 202.

In some examples, a number of apertures or inlet holes 506 are formed by AM process around a periphery of the vaporizer core 202 to allow the admission of heat transmitting material into the central volume 502 of the vaporizer 202 as discussed above.

In more general aspects, the vaporizer core 202 is designed to omit sharp corners to facilitate AM processes and treatment of the various core surfaces. In some examples, the tortuous paths 402 defined by the vaporizer core 202 are smooth and unobstructed between adjacent cells in the nested arrangement. The geometry of the vaporizer core 202 is optimized, in some examples, for AM processes. For example, included or sloped surfaces (with respect to a horizontal or vertical axis in the views) are rendered at angles in excess of 20°. The smooth and optimized geometric elements seek to minimize the entrapment of AM process powder. In some examples, a cell surface finish internal manifold areas may include a 100 to 120 μin Ra print surface, with an order of magnitude reduction in internal areas to 10-15 μin Ra after and abrasive flow machining (AFM) process. The outer skin designed to have intentionally higher surface finish with a design pattern to have the best wetting and gripping with aluminum casting process with increased surface area for better surface heat conductivities in practice.

Reference is now made to FIGS. 6A-6D which show, respectively, a top part-sectional view, a side sectional view, an end part-sectional view, and a side part-sectional view of an example vaporizer 200. The material of a casting or sheath 210 (for example, including an aluminium material) extends into a central volume 502 of each vaporizer core 202 and 204. In some examples the sheath forecasting is machined to accommodate heaters 206 and 208, screws, and a thermocouple. The heaters 206 and 208 may be provided in the form of cartridge heaters. An axial length of each heater 206 and 208 may be arranged to extend across an entire volume of a space between the two vaporizer cores 202 and 204. Other heater arrangements are possible. In some examples, one or more, and in some cases all, of these components (i.e., the heaters 206 and 208, one or more screws, and one or more thermocouples) are encased in the material of the casting or sheath 210, substantially as shown in the views. In some examples, a vaporizer 200 includes a cylindrical shape, having a length in the range of 3-6 inches and an outer circumference in the range 1-3 inches. An outer circumference of the vaporizer core 202 and 204 may be in the range 1-2 inches.

Figure 7:
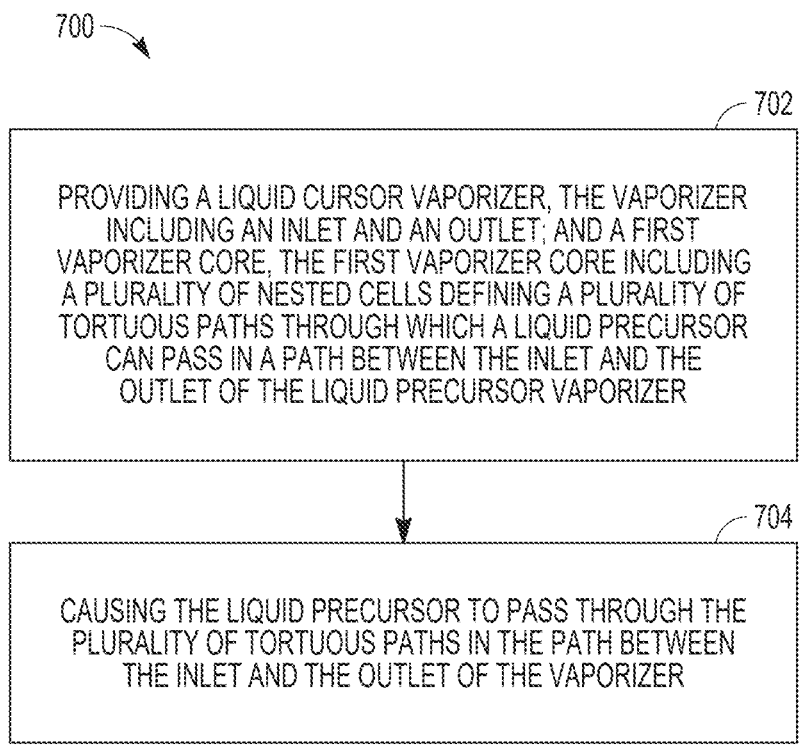
FIG. 7 illustrates example operations in a method for vaporizing a liquid precursor, according to an example embodiment.

Some embodiments of the present disclosure include methods. With reference to FIG. 7, operations in a method 700 for vaporizing a liquid precursor may include, at 702, providing a liquid cursor vaporizer, the vaporizer including an inlet and an outlet; and a first vaporizer core, the first vaporizer core including a plurality of nested cells defining a plurality of tortuous paths through which a liquid precursor can pass in a path between the inlet and the outlet of the liquid precursor vaporizer; and, at 704, causing the liquid precursor to pass through the plurality of tortuous paths in the path between the inlet and the outlet of the vaporizer.

Figure 8:
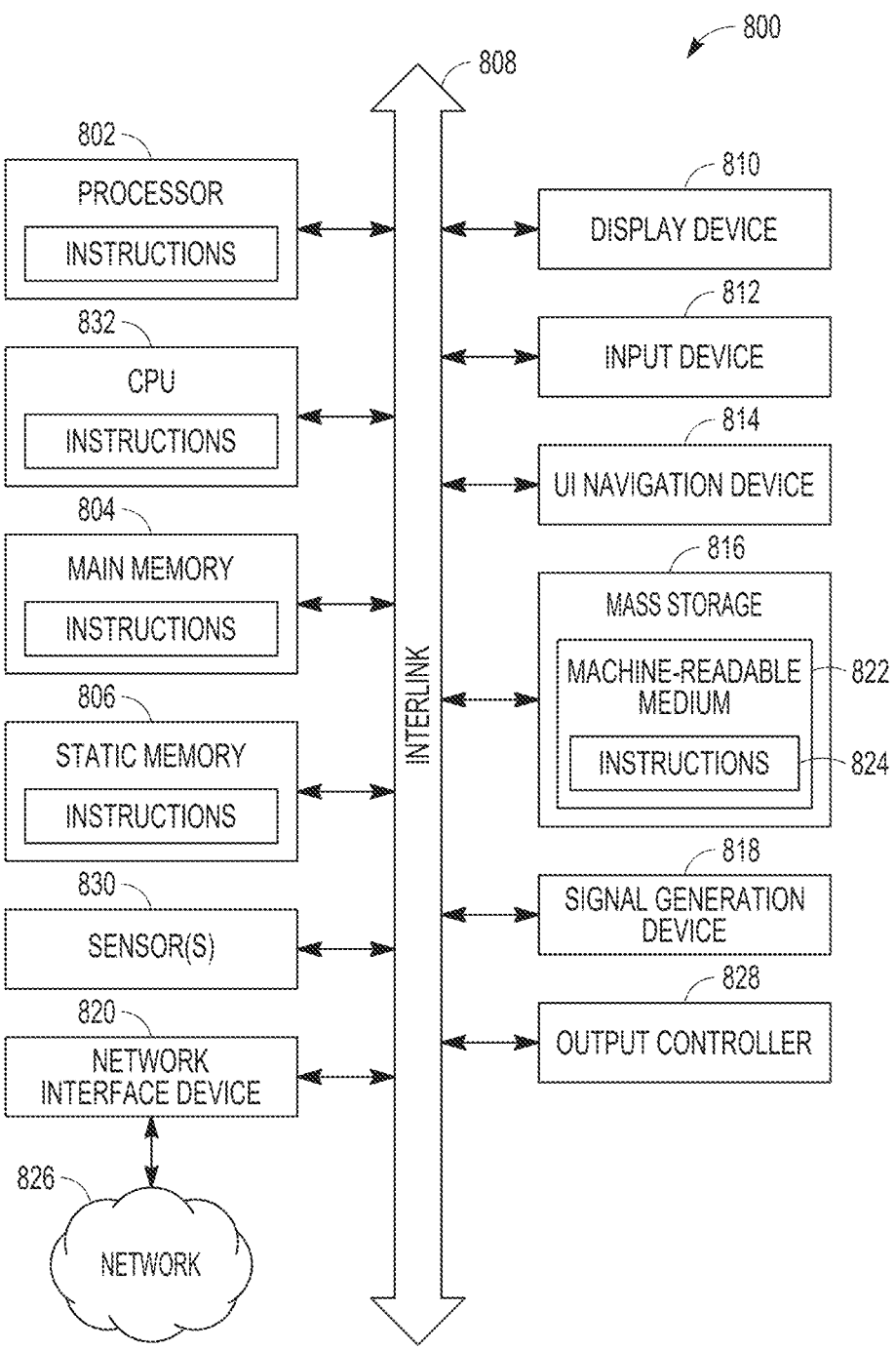
FIG. 8 is a block diagram illustrating an example of a machine upon which one or more example embodiments may be implemented, or by which one or more example embodiments may be controlled.

FIG. 8 is a block diagram illustrating an example of a machine 800 (such as system controller 180) by which one or more example process embodiments described herein may be controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or mom of the methodologies discussed herein, such as via cloud computing, software as a service (SaaS), or other computer cluster configurations.

Examples, as described herein, may include, or may operate by, logic, a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.)

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media 822.

While the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that can store, encode, or carry instructions 824 for execution by the machine 800 and that cause the machine 800 to perform any one or more of the techniques of the present disclosure, or that can store, encode, or any data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals Specific examples of massed machine-readable media may include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks, and CD-ROM and DVD-ROM disks. The instructions 824 may further be transmitted or received over a communications network 826 using a transmission medium via the network interface device 820.

Although an embodiment has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art upon reviewing the above description.

What is claimed is:

1. A liquid precursor vaporizer comprising;
   an inlet;
   an outlet; and
   a first vaporizer core, the first vaporizer core including a plurality of nested cells defining a plurality of confined and tortuous paths through which a liquid precursor can pass between adjacent nested cells in a path between the inlet and the outlet of the liquid precursor vaporizer, wherein the first vaporizer core comprises a plurality of nested cells, wherein some of the nested cells has at least two protruding convex portions and two concave portions, one of the protruding convex portion adjoins but does not abut a concave portion of an adjacent cell to form an integrated nested cell structure, and another protruding convex portion adjoins but does not abut a concave portion of another adjacent cell to form an integrated nested cell structure, defining the plurality of confined and tortuous paths through which a liquid precursor can pass between the adjacent nested cells in the path between the inlet and the outlet of the liquid precursor vaporizer.

2. The vaporizer of claim 1, wherein at least one of the plurality of tortuous paths includes a series of alternating pinch and expanding regions.

3. The vaporizer of claim 1, further comprising a second vaporizer core in communication with the first vaporizer core, the first and second vaporizer cores defining the path for the liquid precursor between the inlet and the outlet of the liquid precursor vaporizer.

4. The vaporizer of claim 3, further comprising a sheath enclosing the first and second vaporizer cores.

5. The vaporizer of claim 4, wherein the sheath enclosing the first and second vaporizer cores includes an aluminum material.

6. The vaporizer of claim 5, wherein the aluminum material extends into a central volume of each of the first and second vaporizer cores.

7. The vaporizer of claim 5, further comprising at least one heater disposed between the first and second vaporizer cores.

8. The vaporizer of claim 1, wherein the first vaporizer core is manufactured by an additive manufacturing (AM) process.

9. The vaporizer of claim 8, wherein the AM process includes a use of laser fused Inconel 718 as an AM material.

10. The vaporizer of claim 8, wherein the AM process includes a post-annealing operation to remove porosity.

11. The vaporizer of claim 1, further comprising a heater.

12. The liquid precursor vaporizer of claim 1, wherein the plurality of nested cells are radially arranged to define the plurality of tortuous paths through which the liquid precursor can pass between radially adjacent nested cells in a path between the inlet and the outlet of the liquid precursor vaporizer.

13. The liquid precursor vaporizer of claim 1, wherein in a view along an axis connecting the inlet and the outlet, the plurality of nested cells comprises a first group of oval-shaped nested cells arranged at a center of the liquid precursor vaporizer and a second group of closed, cloth-hanger-shaped nested cells arranged away from the center of the liquid precursor vaporizer.

14. The liquid precursor vaporizer of claim 1, wherein in a view perpendicular to an axis connecting the inlet and the outlet, the plurality of nested cells comprises a first group of oval-shaped nested cells arranged around the inlet and the outlet, and a second group of open, cloth-hanger-shaped nested cells arranged in a middle of the liquid precursor vaporizer.

15. A liquid precursor vaporizer comprising;
    an inlet;
    an outlet; and
    a first vaporizer core, the first vaporizer core including a plurality of nested cells, each cell including an arcuate or undulating wall profile that, in combination with other cells in the plurality of nested cells, defines a confined and tortuous path through which a liquid precursor can pass between the inlet and the outlet of the liquid precursor vaporizer, the confined and tortuous path including a series of alternating pinch and expanding regions defined by the nested cells, wherein some of the cells have at least two protruding convex portions and two concave portions, one of the protruding convex portion adjoins but does not abut a concave portion of an adjacent cell, and another protruding convex portion adjoins but does not abut a concave portion of another adjacent cell.

* * * * *